K. JUNG.
METHOD OF FORMING HOLLOW GLASS ARTICLES.
APPLICATION FILED JULY 19, 1910.
1,016,832.
Patented Feb. 6, 1912.
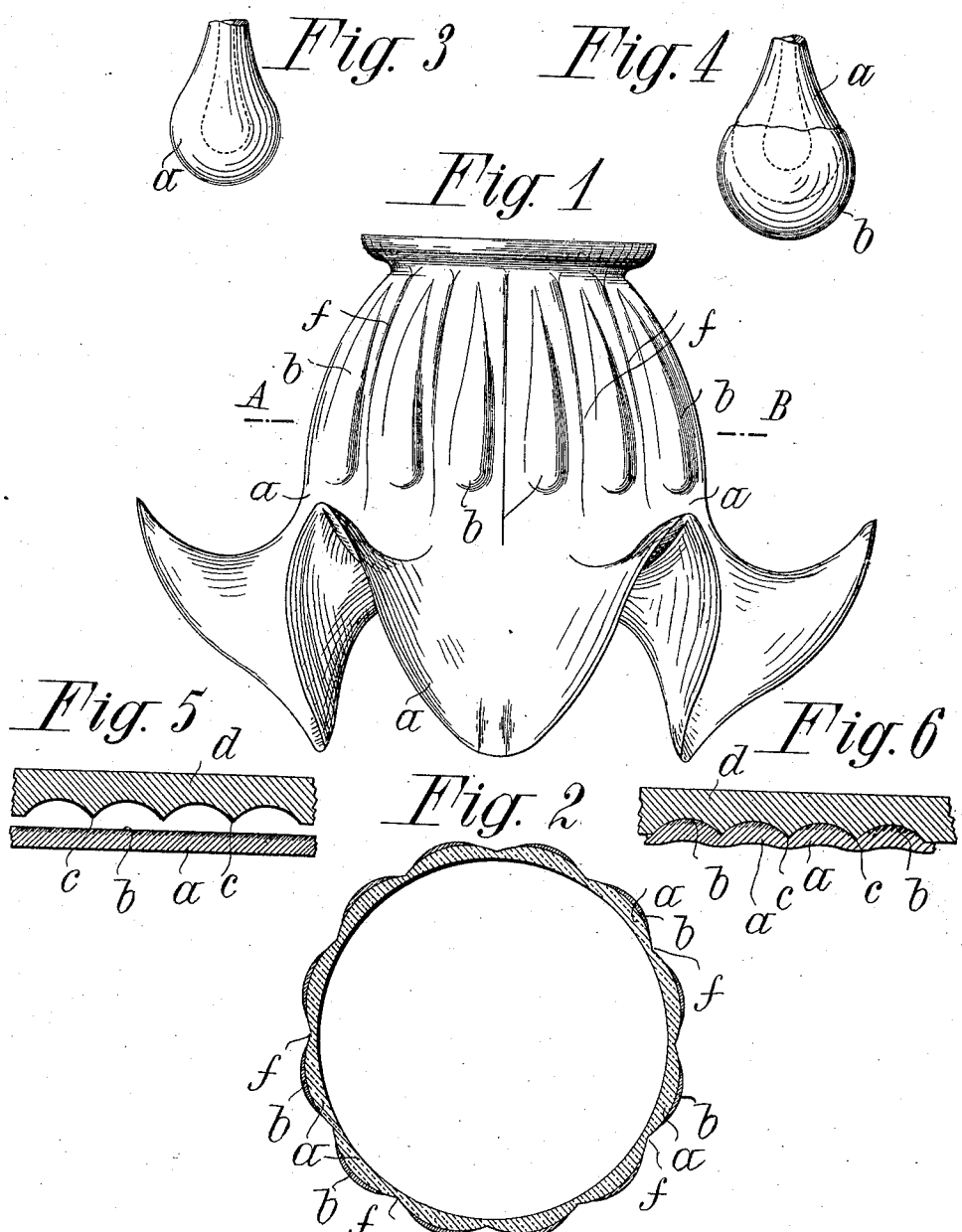
WITNESSES
INVENTOR
Karl Jung
BY
ATTORNEYS

UNITED STATES PATENT OFFICE.

KARL JUNG, OF GROSSPRIESEN-ON-THE-ELBE, AUSTRIA-HUNGARY, ASSIGNOR TO THE FIRM OF GLASFABRIKEN UND RAFFINERIEN JOSEF INWALD A. G., OF VIENNA, AUSTRIA-HUNGARY.

METHOD OF FORMING HOLLOW GLASS ARTICLES.

1,016,832.     Specification of Letters Patent.     Patented Feb. 6, 1912.

Application filed July 19, 1910. Serial No. 572,738.

*To all whom it may concern:*

Be it known that I, KARL JUNG, managing director, a subject of the Emperor of Austria-Hungary, residing at Grosspriesen-on-the-Elbe, in the Kingdom of Bohemia, Empire of Austria-Hungary, have invented certain new and useful Improvements in Methods of Forming Hollow Glass Articles, of which the following is a specification, reference being had to the accompanying drawing, forming a part of this specification, and illustrating one class of glassware to which the invention is applicable.

Figure 1 is a side elevation of a finished globe; Fig. 2 is a transverse section of the same on line A—B of Fig. 1; Fig. 3 is a side view of a small globe of glass; Fig. 4 is a similar view of the said globe with the colored glass thereon; Fig. 5 is a sectional view of a portion of the mold and globe of glass before the latter is pressed into the mold; and, Fig. 6 is a similar view with the glass pressed into the mold.

My invention relates to glass blowing, my more particular purpose being to produce coloration effects in the manufacture of glass articles, such, for instance, as globes and shades made to represent flowers.

My invention further relates to the manufacture of so-called "flashed" glass articles having any desired pattern.

The steps of my process may be briefly summarized as follows: I dip up, in the usual manner, a mass of molten glass from the hearth of the glass furnace, and in doing this, I employ the usual implement, to wit, a blowing tube. The glass thus taken out hangs upon the end of the tube in the form of a small globe $a$ with a thick wall as shown in Fig. 3. This is next dipped into colored glass, to form a coating $b$ of colored glass thereon, as shown in Fig. 4, the coating when first applied being quite thick. By blowing through the tube, the two colors of glass are rendered concentric, that is, as the bulb is expanded, the colored glass takes up its position upon the outside, the colorless glass being concentric to the colored glass and disposed inside of the latter. The bulb is further expanded so that its wall is made thinner and is given a definite configuration upon its external surface. This is done by expanding the globe within a mold $d$ having its inner surface corrugated as shown in Figs. 5 and 6. The sharp edges $c$ of the corrugations of the mold cut through the coating $b$ of colored glass and form corrugations in the globe. This being done, the bulb may be removed and further treated. For instance, it may be reheated and expanded still further. The corrugations upon it are by this step not altogether destroyed, but their depth—represented by the thickness of the glass—is somewhat less pronounced. The result is that the globe thus formed is slightly thicker in one place than at another place immediately adjacent, and the coloration of the glass is correspondingly dense where the glass is thickest, it being understood that the color is less dense at the points $f$ where it has been cut through by the edges of the corrugations of the mold. The globe may now be finished, being fashioned, for instance, into the form of a tulip, and the article thus finished has variations in its thickness corresponding to the corrugations originally imprinted by the mold, the corrugations, however, being much less pronounced than those imprinted by the mold, and the finished article further having a variation in its density of color somewhat analogous to the variation in the thickness of its wall. The net result is that the finished pattern has the appearance of the first portion of glass taken up, this being superposed upon a ground colored according to the color of the glass used in flashing.

The molds employed as above described are distinguished from various other molds heretofore used by the employment of sharp inner edges which serve to destroy and distribute the thickness of the glass and consequently effect the variations in color.

I claim:

The method herein described of forming hollow glass articles, which consists of gathering a mass of molten glass, adding to the exterior of said mass another mass of glass of a different color, partially blowing said mass as a single member thus forming a globe having the added mass of glass distributed over the greater part of the globe, then further inflating said globe in a mold having its inner surface provided with corrugations or other projections adapted to cut substantially through the outer mass of glass, then removing said globe from said mold and further blowing the same, and then converting said globe into a finished article.

In testimony whereof I have affixed my signature in presence of two witnesses.

KARL JUNG.

Witnesses:
 ED. PATSCH,
 ADOLPH FISCHER.

Copies of this patent may be obtained for five cents each, by addressing the "Commissioner of Patents, Washington, D. C."